United States Patent [19]
Kalman

[11] 4,289,819
[45] Sep. 15, 1981

[54] STEP TREAD PLATE

[76] Inventor: James H. Kalman, 1001 City Ave., Philadelphia, Pa. 19151

[21] Appl. No.: 125,842

[22] Filed: Feb. 29, 1980

Related U.S. Application Data

[63] Continuation of Ser. No. 7,114, Jan. 29, 1979, abandoned.

[51] Int. Cl.³ .................... B32B 3/00; B61D 32/00
[52] U.S. Cl. ........................ 428/57; 52/177;
52/588; 105/457; 280/169; 428/143; 428/174;
428/192; 428/354; 428/212
[58] Field of Search ............... 428/57, 58, 141, 142,
428/143, 174, 192, 354, 212; 238/14; 52/177,
179, 181, 188, 595, 588; 106/36; 280/169, 163;
105/443, 457, 460

[56] References Cited

U.S. PATENT DOCUMENTS

| | | | |
|---|---|---|---|
| 606,532 | 6/1898 | Furnoss | 52/179 |
| 1,578,491 | 3/1926 | Welcome | 52/179 |
| 1,812,504 | 6/1931 | Del Turco | 52/188 |
| 3,421,274 | 1/1969 | Balzer et al. | 52/179 |

Primary Examiner—Paul J. Thibodeau
Attorney, Agent, or Firm—Nelson E. Kimmelman

[57] ABSTRACT

The tread plate comprises a substantially flat, elongated metal portion coated on its upper side with a layer of resilient, dark-colored, plastic material through which gritty material is dispersed substantially uniformly throughout its thickness. The first portion has at its outer longitudinal edge a plurality of grooves which are engaged by complementary tongues formed in the longitudinal edge of a second portion whose cross-section is essentially L-shaped. The second portion is also coated with a somewhat resilient plastic material through which gritty particles are distributed. This layer has a color which is substantially lighter (or brighter) than the substantially darker color of the layer on the first portion thereby reflecting substantially more light than said first portion.

8 Claims, 2 Drawing Figures

STEP TREAD PLATE

This is a continuation, of application Ser. No. 007,114, filed Jan. 29, 1979, now abandoned.

BACKGROUND OF THE INVENTION

1. Field of the Invention

This invention relates to steps and in particular to a tread plate for a step which has improved safety and wear characteristics.

2. Prior Art

Previously, protective tread plates for stair or step treads have been known, especially for railroad cars. They have consisted of single piece, ridged metallic plates. However, the ridges often filled up with dirt or debris thereby reducing or eliminating the gripping or frictional effect for which the ridges were provided. Furthermore, use made the top surface smooth so that, in wet weather especially, the foothold was rendered increasingly slippery.

Other previous tread plates are known which were made of a single piece of metal on which a very thin sheet of abrasive, gritty material was placed. Of course, within a short time the sheet wore out and required replacement. In both types of prior art plates the visibility of the plates was less than satisfactory; passengers, especially at night, found it difficult to see the edge of each step.

It is among the objects of the present invention to provide an improved tread plate which enhances the foothold of users and is more durable in this respect and which promotes safety by making the steps and their edges more visible.

SUMMARY OF THE INVENTION

A step tread plate having a first metallic portion having a top layer of a resilient plastic containing gritty particles distributed uniformly through it, the first portion having an edge with a plurality of projections. The plate also has a second, edge-of-step, portion made of metal with a top layer of resilient plastic with gritty particles embedded therein and an edge with a plurality of projections which are intended to intermesh or be interdigitated with the projections of said first portion when both are in place.

DETAILED DESCRIPTION OF THE PREFERRED EMBODIMENT

Figure 1:
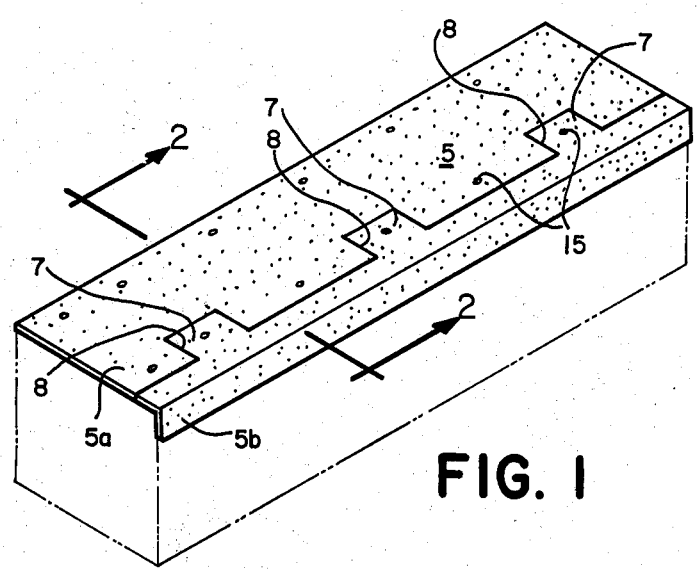
FIG. 1 is an isometric view of the improved tread plate in accordance with my invention.
Figure 2:
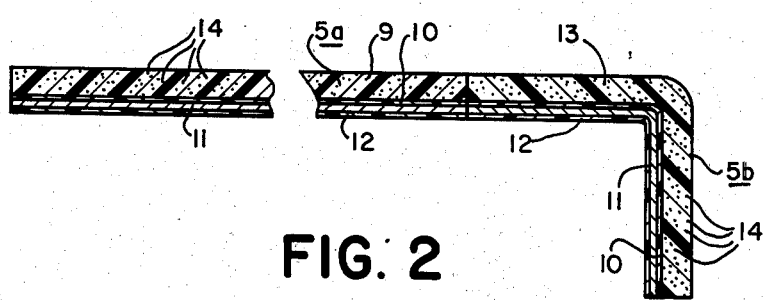
FIG. 2 is a sectional view of the plate shown in FIG. 1 taken along the section line 2—2 thereof in the direction indicated.

Referring to FIGS. 1 and 2, there is shown an improved step tread plate 5 in accordance with the present invention in place on a step 6 shown in phantom lines. The plate 5 consists of a first metallic elongated portion 5a interdigitated with a second metallic, complementary-edged portion 5b. Portion 5a is disposed substantially horizontally to the top surface of the step 6 and may be of a relatively dark color. The portion 5b has tongue portions 7 which fit in the grooves 8 of portion 5a. Portion 5b has a generally L-shaped cross-section and fits over the outer long edge of the step 6. It preferably has a bright, light color so as to contrast with the dark color portion 5a.

As seen in FIG. 2, the portion 5a has an upper resilient plastic layer 9 in which a grit material 14 is embedded substantially throughout its entire thickness. The grit may be aluminum oxide, for example. The plastic layer with the embedded grit is deposited upon the upper surface of a layer 10 of bonding material such as an epoxy phenolic material. The bonding material is applied to the top and bottom surfaces of the metal substrate 11, forming a layer 12 on the bottom surface.

Portion 5b has substantially the same construction, except for shape, as portion 5a except that the top layer 13, which also includes embedded grit material 14, is of a contrasting color to the color of layer 9, preferably being much lighter for greater visibility. Thus, this second portion is substantially more light reflective than said first portion 5a.

When the portions 5a and 5b are placed upon the step 6, screws are driven through the apertures 15 to retain them in position as shown in FIG. 1. The non-straight mating edges of the portions 5a and 5b in the form of the tongue-and-groove pattern, as well as the sharply contrasting colors thereof makes the tread plate extremely visible to the person ascending or descending. The grit material naturally adds a highly frictional surface to prevent slippage and is especially valuable for use with railroad cars to prevent passenger accidents due to missteps, moisture or movement of the train itself. The visibility of the bright edge plate portion 5b also tends to help the passenger using the steps to obtain a secure footing.

Both portions 5a and 5b can be made according to the following process: The cold-rolled steel substrate 11 has applied to both of its sides the bonding agent, such as epoxy phenolic primer, by spraying it at ambient temperature. This bonding agent, in addition to providing a good surface to which the top layers 9 and 13 may be adhered, helps to prevent deterioration of the metal due to electrolysis and the effects of salt and water carried on by the shoes of the passengers.

After the bonding agent is applied to both sides, the layer 9 (in the case of portion 5a) and the layer 13 (in the case of portion 5b) are applied by heating substrate 11 and dipping it into an orange or black plastisol such as one manufactured by Michigan Chrome Corporation to MIL.SPEC 20689-A and then the grit such as aluminum oxide is applied to the soft plastic surface. When the metal is dipped into the plastisol, it is kept agitated to insure an even coating and a random dispersion of the grit particles throughout the layers 9 and 13. The coated members are then dried.

In use, the edge portion 5b may often wear out or down more quickly than portion 5a because foot contact occurs more frequently in that area. It is a simple matter merely to unscrew the retaining screws and substitute a new portion for it.

Of course, the number and dimensions of the tongues and grooves can be varied as desired. Also, a jagged or sawtooth configuration can alternatively be used to attract the rider's attention as well as or better than the right-angle mating edge design.

Still other modifications, which do not depart from the essence of this invention, may occur to one skilled in the art on perusing the drawings and specification herein so that I desire that my invention be defined and limited solely by the following claims.

I claim:

1. A step tread plate for vehicles consisting essentially of:
   (a) a substantially planar and integral metallic first portion having a top layer of a resilient plastic containing gritty particles, said first portion having an edge with a plurality of projections spaced from one another, and
   (b) a second, integral metallic portion having a substantially L-shaped cross-section adapted to fit over the front edge of the step when in place, part of said second portion being disposed substantially horizontal and co-planar with said first portion and having a top layer of a resilient plastic containing gritty particles, the gritty particles in said first and second portions being distributed throughout the thickness of said top layers, said second portion also having an upper horizontal longitudinal edge with a plurality of projections which intermesh with the projections of said first portion, said first and second portions being highly contrasting in color with said second portion being substantially more light-reflective than said first portion.

2. The tread plate according to claim 1 wherein said first and second portions are elongated and of substantially the same length.

3. The tread plate according to claim 1 wherein the projections formed in said edges of said first and second portions have substantially rectangular configurations and the spaces between them are also substantially rectangular.

4. The tread plate according to claim 1 wherein the metal of at least one of said first and second portions is coated on both sides with an anti-corrosive protective layer which is also a bonding agent, said plastic layer on said one portion being applied atop said protective layer.

5. The tread plate according to claim 4 wherein said anti-corrosive protective layer is coated on the sides of both of said portions.

6. The step tread plate according to claim 1 wherein the vertical part of said second portion extends downwardly for a distance less than one-half the height of said step.

7. In a step tread plate for vehicles which include a first substantially planar and integral metallic first portion having a top layer of a resilient plastic which contains gritty particles, said first portion also having an edge with a plurality of spaced projections, the combination of a second, integral metallic portion having a substantially L-shaped cross-section adapted to fit over the front edge of the step, a horizontal part of said second portion being co-planar with said first portion and having a top layer of a resilient plastic which contains gritty particles, said horizontal part having a plurality of projections which intermesh with the projections of said first portion, said second portion being considerably more light-reflective than said first portion.

8. In a step tread plate for vehicles wherein there is an integral metallic portion having a substantially L-shaped cross-section which is adapted to fit over the front edge of the step with one part horizontal and the other part vertical, said portion being covered with a top layer of a resilient plastic which contains gritty particles and wherein said one part has a horizontal edge with a plurality of spaced projections formed therein, the combination of a substantially planar and integral metallic portion covered with a top layer of a resilient plastic which contains gritty particles, said planar portion having a front edge with a plurality of spaced projections formed therein which are adapted to intermesh with the spaced projections of said L-shaped cross-section portion, the top layer of said planar portion being substantially less light-reflective than the top layer of said L-shaped portion.

* * * * *